United States Patent [19]
Gillemot

[11] 3,939,882
[45] Feb. 24, 1976

[54] CABLE RECLAMATION METHOD AND APPARATUS

[75] Inventor: George W. Gillemot, Santa Monica, Calif.

[73] Assignee: John T. Thompson, Los Angeles, Calif. ; a part interest

[22] Filed: Feb. 25, 1974

[21] Appl. No.: 445,278

[52] U.S. Cl. .................. 141/231; 141/383; 156/48; 174/23 R; 259/4 R; 261/121 R; 285/197
[51] Int. Cl.² .......................................... B65B 3/04
[58] Field of Search ......... 285/197; 174/23 C, 23 R; 156/48; 264/174; 117/115; 261/121 R; 259/4, 18, DIG. 17, 183; 141/382–388, 231, 67

[56] References Cited
UNITED STATES PATENTS

| | | | |
|---|---|---|---|
| 2,997,208 | 8/1961 | Kish | 261/121 R |
| 3,729,033 | 4/1974 | Bayerkohler | 141/231 |
| 3,792,879 | 2/1974 | Dunmire et al. | 285/197 |

Primary Examiner—Houston S. Bell, Jr.
Attorney, Agent, or Firm—Harris, Kern, Wallen & Tinsley

[57] ABSTRACT

Cable reclamation method and apparatus by which moisture is precluded from entering or is purged from an electrical cable by injecting a two-part polymerizable compound in liquid phase into and along the cable. Any moisture present is purged through an outlet port distant from the compound entry port. The compound takes a permanent soft-solid set at normal ambient temperatures within a few hours as a paste-like gel readily removable at any future time to permit cable splicing and servicing operations. This soft-solid gel forms a moisture-proof nonconductive sealing barrier precluding entry of moisture and restoring normal cable operating conditions. The compound supply tank is pressurized with air or gas to transfer the compound in liquid phase into the cable, the pressurized gas being used initially to agitate and intermix the compound constituents. The supply tank is preferable mounted on a carriage to facilitate its mobility in the field and the tank access closure features dual safety locks requiring separate deliberate manipulation to release the closure.

10 Claims, 7 Drawing Figures

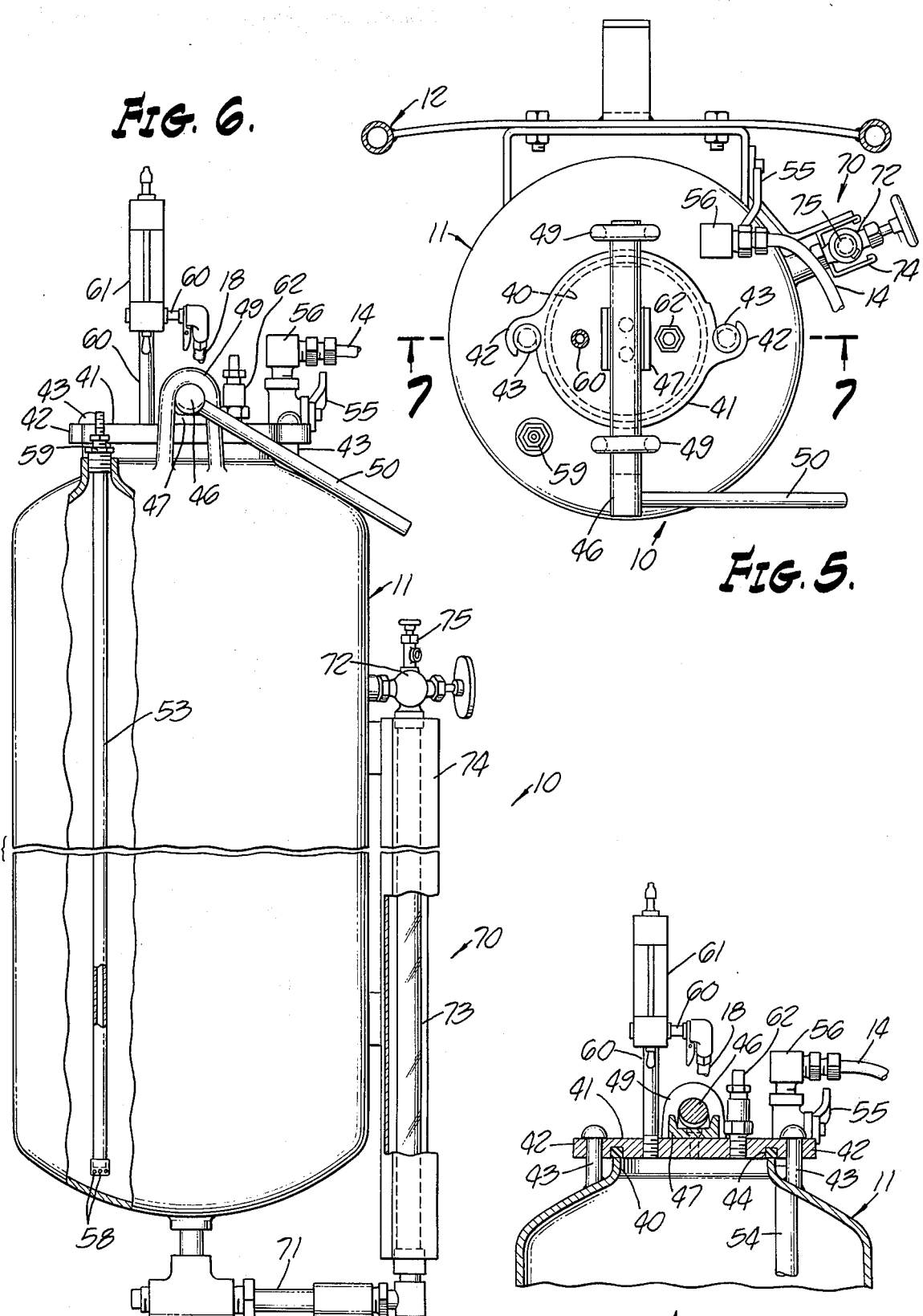

CABLE RECLAMATION METHOD AND APPARATUS

This invention relates to a unique method and apparatus usable to reclaim electrical cables by charging the interior thereof with a moisture purging compound which polymerizes to a soft-solid paste-like consistency readily re-enterable at any time for cable servicing operations.

During recent years a higher and higher percentage of lead sheath cables are being supplanted by plastic insulated cables. The latter sometimes possess or develop pinholes through which moisture can enter the cable and interfere seriously with the operating characteristics of the conductors and the circuits to which the conductors are connected. Various expedients have been resorted to to prevent moisture damage and signal fidelity but these are not always reliable and are subject to disadvantages well known to those skilled in this art. Pressurization of the cable with air, nitrogen or other gas is helpful but not always effective. For example, this expedient does not protect the cable in case of a break in the sheath caused by an act of God or a workman's tool. Pinholes or larger breaks in the sheath are also sometimes caused by lightning or a short circuit caused by contact of the electrical cables with a high tension cable. Once moisture has entered a length of cable it is customary practice to replace the damaged cable with a new length spliced to the ends of the cable to either end of the damaged section. Irrespective of whether the inoperative section is buried or above ground the replacement operation is a laborious, costly, time-consuming operation, to say nothing of the need for suspending service during repairs.

To avoid these and other disadvantages and shortcomings of prior practice, there is provided by this invention a greatly improved method and a simple, effective apparatus for quickly and economically reclaiming a damaged length of cable and restoring it to normal operating efficiency. To this end there is provided portable equipment easily moved into the field and effective to purge the damaged cable of moisture by introducing pressurized freshly mixed potting compound in liquid phase. Prior to gelation, this composition possesses precursor properties in that it has preferential surface wettability over water present on a solid surface. Accordingly, the advance of the compound displaces both free flowing water present in the cable as well as that previously in wetting contact with interior surfaces. Within a matter of hours, the compound completely filling all voids interiorly of the cable completely gels into a soft-solid. The cured solid is waterproof, an excellent electrical insulator and adheres tenaciously to metal, plastic, paper, cloth and the like surfaces with which the liquid blend was in contact during curing. Accordingly, it will be understood the gelled composition is a highly effective sealant filling all interior cable voids and safeguarding against the entry of moisture. Yet the cable is readily re-entered at any time for servicing operations, splicing and the like, it being a simple matter to fragment and remove all portions of the compound needed to provide access to the conductors.

The ingredients of the two-part compound are thoroughly intermingled and mixed in a gas pressurizing tank immediately prior to introduction into the cable by bubbling pressurizing gas through the mixture for a few minutes. Thereafter, the tank is closed and the compound transfer hose is connected to a charging fitting clamped over a charging port in the side of the cable following which the gas pressure is utilized to transfer the compound into and along the interior of the hose toward an outlet port at the other end of the portion of the cable under reclamation. Prior to introducing the compound, the interior portions of the cable to either end of the part being reclaimed are suitably plugged.

Accordingly, it is a primary object of the present invention to provide an improved method and apparatus for sealing electrical cables against the entry of moisture and other foreign material.

Another object of the invention is the provision of an improved method and apparatus for charging an electrical cable with curable potting compound while simultaneously purging the cable of moisture.

Another object of the invention is the provision of simple, portable equipment utilizing pressurized gas to charge the interior of electrical cables with a liquid compound possessing preferential surface wettability over water prior to curing into a soft-solid condition.

Another object of the invention is the provision of apparatus and method for introducing a two-part polyurethane compound into and along the interior of an electrical cable which gels in a few hours into a soft-solid at ambient temperatures thereby effectively sealing the cable against the entry of moisture and which cable is re-enterable at any time with a minimum of inconvenience.

These and other more specific objects will appear upon reading the following specification and claims and upon considering in connection therewith the attached drawings to which they relate.

Referring now to the drawings in which a preferred embodiment of the invention is illustrated:

FIG. 5 is a fragmentary cross-sectional view on an enlarged scale taken along line 5—5 on FIG. 1;

FIG. 6 is a fragmentary elevational view partly in section of the charging apparatus; and FIG. 7 is a cross-sectional view taken along line 7—7 on FIG. 5.

Figure 1:
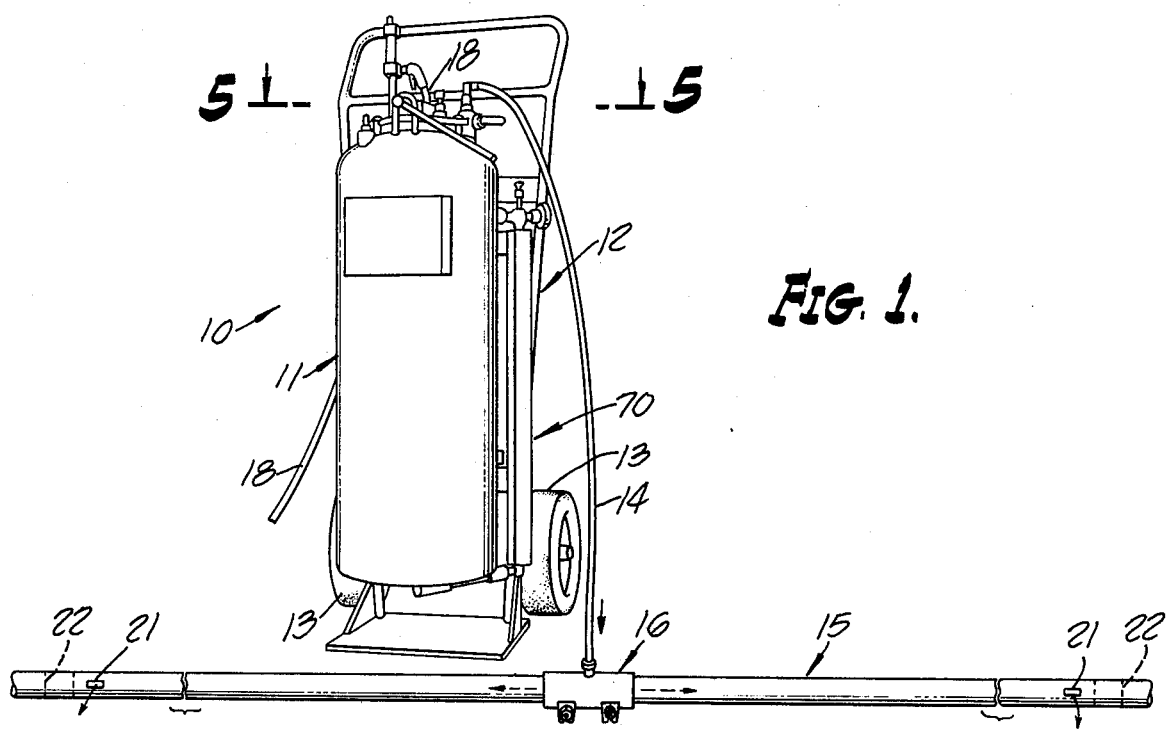
FIG. 1 is a view of an illustrative embodiment of the invention charging apparatus in use to charge a length of moisture-contaminated cable with compound from the midlength thereof.

Referring initially more particularly to FIG. 1, there is shown an illustrative embodiment of the cable reclamation apparatus, designated generally 10, comprising a pressurizing charging tank 11 supported in an upright position on a two-wheeled cart or truck 12. This truck is equipped with a pair of wide tread carriage wheels 13 permitting the equipment to be moved readily into the field or wherever there may be need for the apparatus along installed cabling. The purging compound contained in the tank is transferred via a flexible hose 14 into the interior of an electrical cable 15 through a charging fitting 16. Air, nitrogen, or some inert gas under pressure is supplied into tank 11 via a hose 18 connected to any suitable source of pressurized gas.

Figure 2:
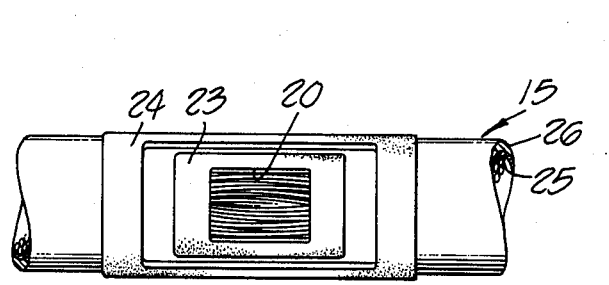
FIG. 2 is a plan view on an enlarged scale of the cable showing details of the charging port before assembly of the charging fitting thereover.

Cable 15 is prepared for the reclaiming operation by cutting a window or charging port 20 (FIG. 2) through the sidewall either at one end of the section to be reclaimed or at the midlength of this portion, the latter mode being illustrated in FIG. 1. Outlet ports 21, 21 (FIG. 1) are likewise cut through the sheath at one or both ends of the portion being reclaimed and the interior of the cable closely downstream from the outlet ports 21, 21 is suitably plugged as indicated at 22, 22. These plugs are formed in known manner by injecting a plugging compound thereby confining the flow of compound to the portion of the cable being reclaimed. If the cable 15 has a double sheath, then it is desirable to apply separate rings of mastic 23, 24 about the charging port 20; otherwise a single outer ring of mastic 24 suffices. The inner rim of the smaller ring 23 of mastic is pressed inwardly along the sidewalls of port 20 thereby precluding risk of the pressurized compound entering between the inner and outer cable sheaths 25, 26.

Figure 4:
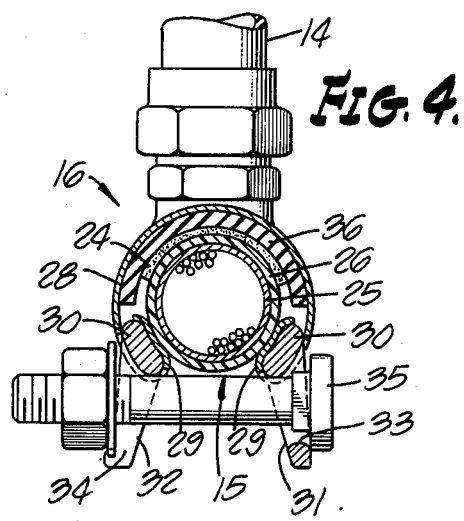
FIG. 4 is a cross-sectional view taken along line 4—4 on FIG. 3.
Figure 3:
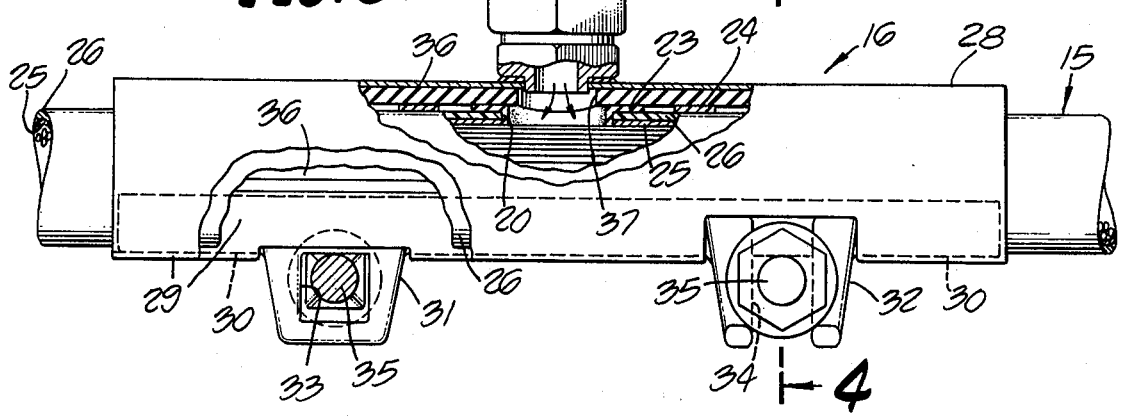
FIG. 3 is a side elevational view of FIG. 2 but showing the charging fitting assembled to the cable.

Charging fitting 16 has a C-shaped main body 28 of high strength flexible sheet material such as stainless steel. The opposite lateral edges 29 of this sheet material are wrapped about clamping bars 30, 30 in the manner best shown in FIG. 4. These bars have pairs of clamping lugs 31, 32 projecting laterially through openings in the sheet material in the manner best shown in FIGS. 3 and 4. Lugs 31 are formed with openings 33 whereas lugs 32 are provided with open ended notches 34. A clamping bolt 35 extends through a related opening 33 and slot 34 as is best shown in FIG. 4. Bonded to the interior of the main body 28 of fitting 16 is a thick resilient elastomeric gasket 36 provided with an opening 37 encircling the charging port 20. Gasket 36 extends the full length of the main body and cooperates with mastic rings 23, 24 in sealing the charging fitting about the cable charging port 20 as clamping bolts 35 are tightened.

Referring now more particularly to FIGS. 5–7, it will be understood that tank 11 has a large charging opening 40 at its upper end normally closed by a closure plate 41. Closure 41 is detachably held sealed against the edge of opening 40 by separate and independent locking devices one of which is of the bayonet coupling type and the other of which utilizes a hand-operated locking bar. The first of these locking devices comprises a pair of notched lugs 42, 42 having their slots facing in opposite directions and seating snugly about the shanks of a pair of rivets 43 having their lower ends welded to the top of the tank on diametrically opposed sides of opening 40 (FIGS. 5, 7). As is made clear by FIG. 5, slight rotary movement of closure 41 in a clockwise direction serves to disengage lugs 42 from beneath the heads of rivets 43, whereas when the lugs are in the position shown in FIG. 5 rivets 43 are snugly seated at the inner ends of the notched lugs and the gasket 44 (FIG. 5) is seated against the rim edge of opening 40.

The second lock for closure 41 comprises an L-shaped locking bar 46 the larger diameter leg of which is insertable crosswise of closure 41 provided closure 41 is in its fully locked position beneath the heads of rivets 43, 43. Assurance against assembly of the locking bar except when the closure is so assembled to the bayonet connectors is provided by a channel-shaped member 47 riveted or otherwise firmly secured to the exterior of closure 41 with its axis at right angles to a plane through rivets 43, 43. The main body of the locking bar extends through a pair of inverted retainer loops 49, 49 welded or otherwise secured to the top of tank 11. The opposite end portions of locking bar 46 are radially offset or eccentrically disposed relative to the midportion of this bar and provide camming surfaces which cooperate to press closure 41 under high pressure across the rim edge of the tank opening 40 when the locking bar is rotated to the closed position shown in FIGS. 5 and 6 by manual manipulation of its operating handle 50. Thus, when handle 50 is in the four o'clock position shown in FIG. 6, the closure is held clamped under high pressure against opening 40 whereas, when handle 50 is rotated counterclockwise toward an upright position, the pressure between the closure plate and the camming surface of the locking bar is released and the locking bar may be withdrawn and removed from loops 49, 49. The operator may then rotate closure 41 clockwise about its center to disengage the bayonet couplings 42, 43 and lift the closure away from the tank opening.

The interior of the tank includes a compound mixing probe or tube 53 (FIG. 6) and a compound outlet tube 54 (FIG. 7). The latter is provided exteriorly of the tank with any suitable manual valve 55 and is coupled to the charging hose 14 by a fitting 56. The outlet tube 54 extends to the bottom of the tank where it is in open communication with the contents of the tank.

Mixing probe 53 likewise extends to the bottom of the tank and is provided with a plurality of outlet ports 58 through which pressurized gas issues into the contents of the tank as a multiplicity of widely distributed bubbles which rise through the ingredients of the compound to thoroughly intermix the same. The upper end of probe 53 includes a suitable check valve and a threaded outer end to which the gas pressurizing hose 18 is readily attachable. When hose 18 is not in use to mix the ingredients of the compound, it is coupled to a conduit 60 mounted in an opening through closure 41. As shown in FIG. 6, the intermediate portion of the air inlet conduit 60 is equipped with any suitable flow gauge 61 providing a visual indication of gas flow into the tank. Each of the inlet conduits 53 and 60 is equipped with check valves which are normally closed unless pressurized air is being supplied into the interior of the tank. It is also pointed out that the tank includes a pressure relief valve 62 of any suitable construction operable to release air if the supply pressure exceeds a preselected value such as 80 psi.

Referring to FIGS. 5 and 6, it will be noted that tank 11 is provided with a liquid level gauge designated generally 70 having its lower end 71 in communication with the bottom of the tank and its upper end in communication with the upper sidewall through a valve fitting 72. The transparent portion 73 of the level gauge is preferably protected by a U-shaped guard 74. Also connected to the sight gauge valve 72 is a normally closed drain valve 75 which is useful for various purposes including flushing of interior surfaces of the equipment after use.

In use, apparatus 10 is charged with the requisite portion of liquid prepolymer and a curing solution therefor, a particularly suitable compound being that disclosed in my copending application for U.S. Letters Patent, Ser. No. 444,264, filed Feb. 21, 1974, entitled A SOFT-SOLID POLYURETHANE COMPOSITION. The prepolymer part of this compound is packaged separately from the curing solution since intermixing of these parts initiates the gelation cycle. The two liquid parts in appropriate quantities are charged into tank 11 following which the pressurized gasline 18 is coupled to the upper end of mixing probe 53. The pressurized air, nitrogen or other appropriate inert gas is bubbled through probe openings 58 and into the liquid mixture for an adequate period to assure thorough intermixing of the two parts of the composition, namely, the prepolymer and the curing solution. The liquid blend of this composition has a viscosity of the order of about 200 cps at 70°F. and is readily introduced into the cable by gas suitably pressurized to say 60, 80 or 100 psi depending on working conditions, the size, length and strength of the cable being purged and sealed. Injection pressure varies with the viscosity of the liquid blend, the construction of the cable, and the size of the voids interiorly of the cable. This specially compounded polyurethane composition gels at normal ambient temperature in about 8–24 hours at 70°F. and usually in a period of 12–16 hours. Curing takes place under no significant exotherm conditions with no noticeable expansion or shrinkage during gelation. The fully gelled composition adheres tenaciously to any surface with which the liquid blend is in contact as curing progresses.

As the liquid composition advances along the interior of the cable toward the one or both outlet ports 21, 21, all water in liquid condition is purged by the advance of the composition. Of particular significance is the fact that the precursor properties of the compound, i.e., its preferential wettability characteristic of the compound over that of moisture, result in all traces of any moisture present being removed and pushed ahead of the advancing compound and in front of the leading edge of the flowing liquid. Charging of the compound continues until the compound reaches the purging port 21 and seals the latter closed.

Preferably the two parts of the compound are handled and stored together in a two-part package assembly containing the precise requisite proportions of each part of the compound. In excess of the requisite amount of compound required for the length of cable being charged is charged into tank 11 since the charging operation should preferably be continued without interruption until the selected length of cable is properly and fully charged. Up to 500 feet of cable is reclaimable in a single charging operation. If longer sections are in need of reclamation, the charging operation is repeated in separate increments and from the required number of charging ports until the full length of the cable has been charged and sealed.

Progress of the charging operation is ascertainable both by noting the liquid level of the composition in sight gauge 70 and in observing the operation of the flow gauge 61. Should it be desirable to gain access to the interior of the tank for any purpose, the operator first manipulates the pressure relief valve 62 to release all air pressure. Once the operator is certain that the air pressure has been released, he rotates the operating handle 50 of locking bar 46 to release this second or safety lock, detaches the locking bar, and then rotates the closure 41. Before attempting to depressurize tank 11 the operator should of course detach the air hose 18 from the inlet conduit 60. Initial pressurization of the tank is preferably done through the mixing probe 53 thereby making efficient use of the gas flow to assure mixing of the compound parts. Once the tank has been pressurized, hose 18 is transferred from the mixing probe to inlet conduit 60.

While the particular cable reclamation method and apparatus herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. Cable reclamation apparatus for injecting a premixed two-part liquid compound into and along a sheathed electrical cable, through a compound entry port in the sheath of the cable, to purge the cable of moisture, comprising a gas-pressurized tank having compound dispensing hose means terminating in a charging means sealably engageable with the exterior of the cable around the compound entry port with the hose means in communication with the compound entry port, means for supplying pressurized gas to said tank to pressurize and dispense liquid compound therefrom and into the cable along said dispensing hose means, and mixing means, comprising means for bubbling pressurized gas through the liquid compound, for mixing the two parts of the compound before starting to dispense the compound into the cable.

2. Cable reclamation apparatus as defined in claim 1 characterized in the provision of a compound charging opening in the wall of said tank, closure means for said opening, and separate independently operable means for locking said closure means in assembled position over said charging opening.

3. Cable reclamation apparatus as defined in claim 2 characterized in that said separate closure locking means includes a plurality of bayonet connectors distributed about said compound charging opening and the periphery of said closure means and cooperating to lock said closure means releasably assembled over said charging opening.

4. Cable reclamation apparatus as defined in claim 3 characterized in that said separate closure locking means includes a locking bar insertable crosswise of the exterior of said closure means and through retainer lug means fixed to said tank on either side of said charging opening, and said locking bar having cam means engageable with said closure means as said locking bar is rotated about the longitudinal axis thereof to lock said closure means sealed across said charging opening.

5. Cable reclamation apparatus as defined in claim 1 characterized in that said means for mixing said two-part compound comprises normally closed tubular means extending through the tank wall for supplying pressurized gas into the tank to mix the parts of said compound together, and the inner end of said tubular means being perforated and normally submerged in said compound and effective to bubble pressurized gas therethrough.

6. Cable reclamation apparatus as defined in claim 1 characterized in that said charging means includes a channel-shaped charging fitting shaped to snugly embrace the cable to be reclaimed, and straight fastener means connected to and spanning the edges of the open side of said charging fitting and adapted to be tightened to hold said charging fitting clamped against the cable in a fluidtight manner while pressurized compound is being injected into the cable through the compound entry port.

7. Cable reclamation apparatus as defined in claim 6 characterized in that said charging fitting is provided with a semi-cylindrical inner surface and including resilient gasket means engaging such surface and engageable with the cable sheath around the compound entry port therein.

8. Cable reclamation apparatus as defined in claim 1 characterized in the provision of carriage means secured crosswise of the lower end of said tank on which said tank can be wheeled from place to place.

9. Cable reclamation apparatus as defined in claim 1 characterized in the provision of a wheeled truck having a main frame extending upwardly along one side of said tank and secured thereto, and said tank being readily movable from place to place by tilting said truck and tank in a direction such that said tank is fully supported on the truck wheels.

10. Cable reclamation apparatus for displacing moisture within an electrical cable with a polymerizable compound initially in liquid phase as charged into the cable, said apparatus comprising: a pressurizable tank for liquid polymer and having an outlet conduit for polymer, means for pressurizing said tank with gas under pressure, a cable charging fitting having its midportion connected to the outlet end of said outlet conduit, said charging fitting having an elongated C-shaped main body of flexible sheet material, clamping fastener means extending straight across the edges of said C-shaped main body and effective upon being tightened after said main body has been assembled about a cable to clamp said fitting against the exterior of a cable in a fluidtight manner, and gasket means interposed between the cable sheath and the interior surface of said main body to assure a fluidtight fit between juxtaposed surfaces of the cable sheath and of the main body of said charging fitting.

* * * * *